(12) United States Patent
Takatsu (10) Patent No.: US 10,885,147 B2
(45) Date of Patent: Jan. 5, 2021

(54) OPTIMIZATION APPARATUS AND CONTROL METHOD THEREOF

(71) Applicant: FUJITSU LIMITED, Kawasaki (JP)

(72) Inventor: Motomu Takatsu, Shinjuku (JP)

(73) Assignee: FUJITSU LIMITED, Kawasaki (JP)

(*) Notice: Subject to any disclaimer, the term of this patent is extended or adjusted under 35 U.S.C. 154(b) by 77 days.

(21) Appl. No.: 16/269,676

(22) Filed: Feb. 7, 2019

(65) Prior Publication Data

US 2019/0278829 A1 Sep. 12, 2019

(30) Foreign Application Priority Data

Mar. 12, 2018 (JP) ................................ 2018-043896

(51) Int. Cl.
 *G06F 17/17* (2006.01)

(52) U.S. Cl.
 CPC .................................... *G06F 17/17* (2013.01)

(58) Field of Classification Search
 None
 See application file for complete search history.

(56) References Cited

U.S. PATENT DOCUMENTS

| 2011/0231462 A1* | 9/2011 | Macready | ............... | G06F 17/11 |
| | | | | 708/231 |
| 2017/0255872 A1* | 9/2017 | Hamze | .................... | G06F 15/76 |

FOREIGN PATENT DOCUMENTS

| JP | 9-34951 | 2/1997 |
| JP | 10-247186 | 9/1998 |

OTHER PUBLICATIONS

Japanese Platform for Patent Information English abstract for Japanese Patent Publication No. 10-247186, published Sep. 14, 1998.

(Continued)

*Primary Examiner* — Michael D. Yaary
(74) *Attorney, Agent, or Firm* — Staas & Halsey LLP (57) ABSTRACT

A first evaluation function calculation unit and a second evaluation function calculation unit calculate a cost function term $E_i$ and a penalty function term $P_i$ in an evaluation function, respectively. A transition control unit stochastically determines whether to accept any of state transitions, based on a product of a ratio between an inverse temperature $\beta_i$ and a penalty factor $\alpha_i$ and $P_i$ and $E_i$. An exchange control unit supplies $\beta_i$ and $\alpha_i$ to each annealing unit, $\beta_i$ and $\alpha_i$ having been set such that each annealing unit has a different ratio between $\beta_i$ and $\alpha_i$, receives $E_i$ and $P_i$ from each annealing unit, and exchanges $\beta_i$ between first and second annealing units among the plurality of annealing units and $\alpha_i$ between the first and second annealing units, in accordance with a probability based on $\beta_i$, $\alpha_i$, $E_i$, and $P_i$ of the first and second annealing units.

7 Claims, 5 Drawing Sheets

(56) References Cited

OTHER PUBLICATIONS

Japanese Platform for Patent Information English abstract for Japanese Patent Publication No. 9-34951, published Feb. 7, 1997.
Koji Hukushima et al., "Exchange Monte Carlo Method and Application to Spin Glass Simulations", Proceedings of Journal of the Physical Society of Japan, vol. 65, No. 6, Jun. 15, 1996, pp. 1604-1608.
Zheng Zhu et al., "A generalized global update algorithm for Boolean optimization problems", arXiv:1605.09399v1[physics.comp-ph], May 30, 2016, pp. 1-19.

* cited by examiner

| EMBODIMENTS | PARAMETER DETERMINATION METHODS |
|---|---|
| FIRST | LARGER $\beta_i$ IS, LARGER $\alpha_i / \beta_i$ WILL BE (SMALLER $\beta_i$ IS, SMALLER $\alpha_i$ WILL BE) |
| SECOND | SINGLE VALUE $\beta$ IS SET AS $\beta_i$ IN ALL ANNEALING UNITS DIFFERENT $\alpha_i$ IS SUPPLIED TO EACH ANNEALING UNIT |
| THIRD | $\alpha_i = c\beta_i - d$ |
| FOURTH | $\alpha_i$ AND $\beta_i$ ARE INDEPENDENTLY CHANGED |

OPTIMIZATION APPARATUS AND CONTROL METHOD THEREOF

CROSS-REFERENCE TO RELATED APPLICATION

This application is based upon and claims the benefit of priority of the prior Japanese Patent Application No. 2018-043896, filed on Mar. 12, 2018, the entire contents of which are incorporated herein by reference.

FIELD

The embodiments discussed herein relate to an optimization apparatus and a control method thereof.

BACKGROUND

In today's society, information processing is performed in various fields by using arithmetic devices such as computers. Meaningful results are obtained by calculating and processing various data, and the obtained results are used for prediction, determination, and control operations, for example. One example of the information processing is optimization, which is an important field. For example, there is a problem in which a solver seeks a solution that minimizes the resources or cost needed to achieve a certain goal. The solver may seek a solution that maximizes an effect obtained by solving the problem. Apparently, solving these problems is very important.

Among the optimization problems, it is known that many problems referred to as discrete optimization problems, combinatorial optimization problems, etc. are very difficult to calculate, since these problems involve discrete values, not continuous values, as variables. What makes solving these discrete optimization problems difficult the most is that there are very many states referred to as local solutions. While a local solution is not an optimal solution, it indicates a minimum value in local neighborhood.

Since there are no general algorithms for efficiently solving these discrete optimization problems, any one of the approximatetion algorithms that use characteristics unique to the target problem or any one of the algorithms referred to as metaheuristics that are not very dependent on characteristics of the target problem needs to be used.

The following description relates to an algorithm that uses Markov chain Monte Carlo methods among the metaheuristics. In particular, the following description relates to simulated annealing in a broad sense such as simulated annealing referred to as an exchange Monte Carlo method or a replica exchange method.

Simulated annealing is a method for obtaining an optimal solution by stochastically changing a state (variable vector values) by using a random number. The following description will be made by using, as an example, a problem in which a value of an evaluation function to be optimized is minimized, and the value of the evaluation function will be referred to as energy. If the problem was to maximize the value, the sign of the evaluation function would be changed.

In simulated annealing, it has been proved that a state reaches an optimal solution with an infinite time (an infinite number of iterations) if the adoption (acceptance) probability of the transition of the state is determined as follows by using an energy change and a temperature associated with the transition.

$$p(\Delta E, T) = f(-\Delta E/T) \quad (1\text{-}1)$$

$$f_{metro}(x) = \min(1, e^x) \text{ (METROPOLIS METHOD)} \quad (1\text{-}2)$$

In the above formula (1-1), T is a parameter that denotes a temperature, and it is desirable that a sufficiently large value be set as the initial value of the temperature T on the basis of the target problem and be decreased sufficiently slowely.

As described above, in simulated annealing, an optimal solution is reached by setting an infinite number of iterations. However, in reality, since a solution needs to be obtained with a finite number of iterations, an optimal solution is not obtained certainly. In addition, since the temperature drops very gradually as described above, the temperature does not drop sufficiently within a finite time. Thus, in many cases of actual simulated annealing, the temperature is dropped more quickly, instead of adopting the temperature change that ensures the theoretical convergence.

In actual simulated annealing, an optimization apparatus starts with an initial state and repeats the above iteration while dropping the temperature. When a certain number of iterations is reached, the optimization apparatus ends the operation. Alternatively, when a termination determination condition is satisfied, for example, when the energy falls below a certain value, the optimization apparatus ends the operation. The solution outputted by the optimization apparatus represents the state corresponding to the end of the operation. However, in reality, since the temperature does not reach 0 with a finite number of iterations, an individual state occupancy rate falls within a distribution represented by a Boltzmann distribution or the like even at the end of the operation. Namely, there is no guarantee that an optimal solution or a good solution is obtained. Thus, in a realistic algorithm, the state corresponding to the minimum energy obtained with a finite number of iterations is stored and outputted finally.

While simulated annealing is a versatile method and is very appealing, since the temperature needs to be dropped gradually, a relatively long calculation time is needed. In addition, it is difficult to suitably adjust how the temperature is dropped based on the problem. If the temperature is dropped excessively slowly, the temperature is not dropped sufficiently within a finite time. Thus, since the energy range of the final heat distribution is wide, the occupation probability of a good solution is not increased. In contrast, if the temperature is dropped excessively quickly, since the temperature is dropped before the state escapes from a local solution, the state remains stuck at the poor solution. Namely, the probability that a good solution is obtained is reduced.

In a replica exchange method (for example, see Koji Hukushima and Koji Nemoto, "Exchange Monte Carlo Method and Application to Spin Glass Simulations", Journal of the Physical Society of Japan, June 1996, Vol.65, No. 6, pp. 1604-1608.), Monte Carlo searches that use a plurality of temperatures are simultaneously performed, and each time a certain number of iterations are performed, the energies of the respective states are compared with each other, and states corresponding to two temperatures are exchanged with an appropriate probability.

Figure 5:
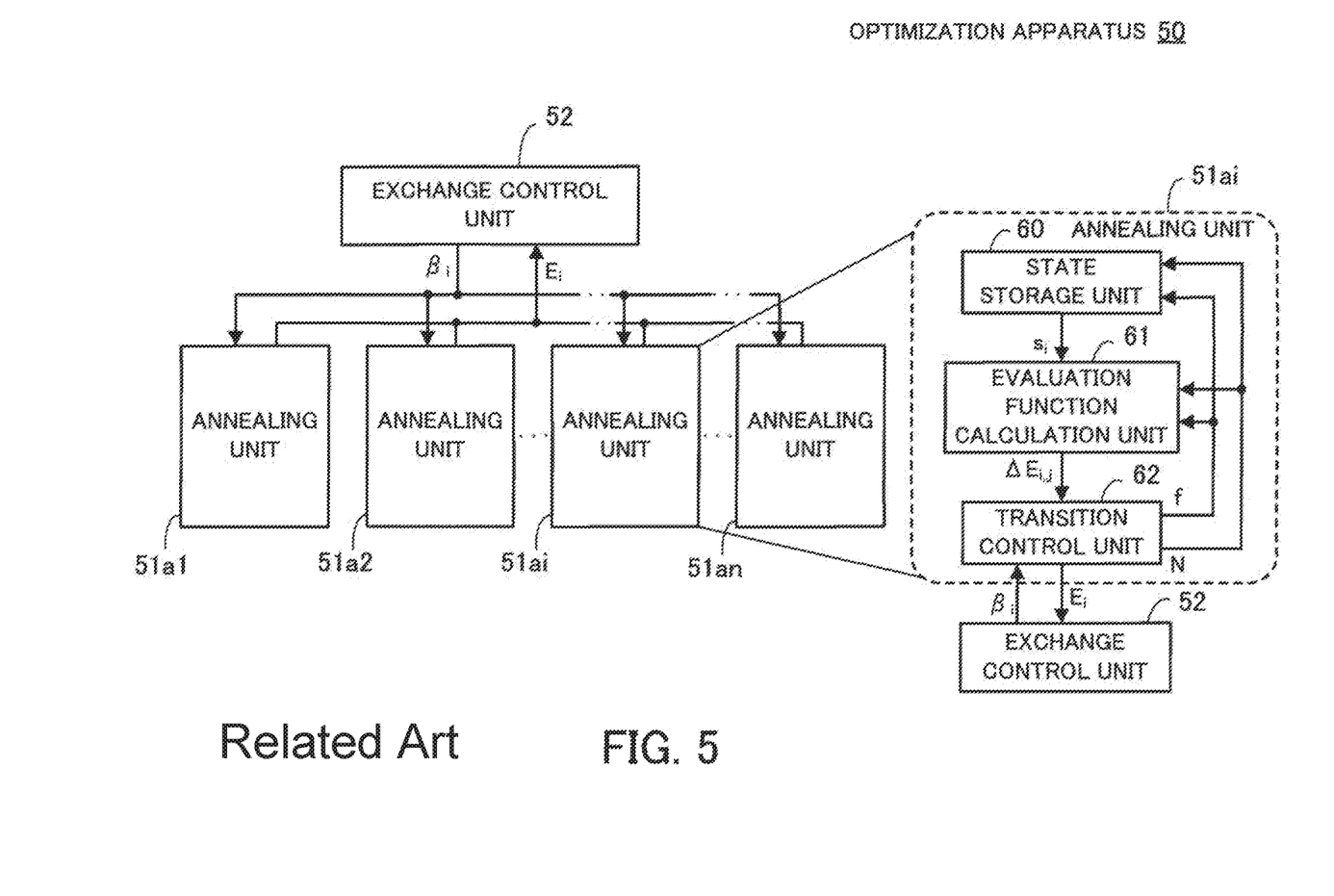
FIG. 5 illustrates a configuration example of an optimization apparatus that uses a conventional replica exchange method.

FIG. 5 illustrates a configuration example of an optimization apparatus 50 that uses a conventional replica exchange method. Unlike an optimization apparatus that uses conventional simulated annealing, the optimization apparatus 50 includes a plurality of Monte Carlo search units (annealing units 51a1, 51a2, 51ai, . . . , and 51an in FIG. 5) and an exchange control unit 52. The exchange control unit 52 supplies an inverse temperature $\beta_i$ (the reciprocal of T) ($1 \leq i \leq n$) to each of the annealing units 51a1 to 51an.

While FIG. 5 illustrates a configuration example of the annealing unit 51ai, the other annealing units also have the same configuration. The annealing unit 51ai includes a state storage unit 60, an evaluation function calculation unit 61, and a transition control unit 62.

The state storage unit 60 holds values of a plurality of state variables included in an evaluation function. In addition, based on a flag f that indicates a state transition determination result and a number (index) N of a state variable indicated by the flag f, the state storage unit 60 updates a state $s_i$, corresponding to the values of the plurality of state variables (the above variable vector values).

The evaluation function calculation unit 61 calculates change of an energy associated with change of a state variable (a state transition). For example, when the evaluation function is represented by an icing model represented by the coupling between two state variables and when transition of only one state variable is allowed at a time, the evaluation function calculation unit 61 calculates an energy change associated with change of an individual state variable (a state transition), based on the values of the respective state variables, coupling coefficients, each of which indicates the coupling strength between state variables, a number N, and a flag f. An energy change $\Delta E_{i,j}$ indicates an energy change associated with change of the j-th state variable. The values of the coupling coefficients based on the optimization problem to be calculated are stored in advance in a memory, a register, or the like. When the evaluation function is not represented by an ising model and when transitions of a plurality of state variables are allowed at a time, while the numbers of the state transitions do not necessarily match the numbers of the state variables that change, no problem arises as long as the energy changes corresponding to the respective state transition numbers are appropriately calculated.

As in a conventional simulated annealing, the transition control unit 62 performs a Monte Carlo search by determining the acceptance probability of the state transition based on the j-th state variable in accordance with the following formula (2) that uses the energy change $\Delta E_{i,j}$ and the corresponding inverse temperature $\beta_i$ supplied by the exchange control unit 52.

$$p(\Delta E_{i,j}, \beta_i) = f(-\beta_i \Delta E_{i,j}) \qquad (2)$$

In formula (2), the function f is equivalent to formula (1-1), and for example, a function based on a Metropolis method expressed by formula (1-2) is used. Based on the above state transition acceptance probability, the transition control unit 62 outputs a flag f that indicates a state transition determination result and a state transition number indicated by the flag f. In addition, the transition control unit 62 updates and outputs an energy $E_i$, based on the energy change $\Delta E_{i,j}$.

The exchange control unit 52 observes the energies $E_i$ outputted by the respective annealing units each time a certain number of iterations are performed and exchanges the inverse temperatures $\beta_i$ and $\beta_j$ supplied to the two of the annealing units 51a1 to 51an, based on the exchange probability expressed by the following formula (3) that uses the corresponding two energies and temperatures.

$$p_{ij} = f((\beta_i - \beta_j)(E_i - E_j)) \qquad (3)$$

In formula (3), $\beta_i$ denotes the inverse temperature supplied to the annealing unit 51ai, and $\beta_j$ denotes the inverse temperature supplied to the j-th annealing unit not illustrated. In addition, $E_i$ denotes the energy outputted by the annealing unit 51ai, and $E_j$ denotes the energy outputted by the j-th annealing unit. In formula (3), the function f is equivalent to formula (1-1), and for example, a function based on a Metropolis method expressed by formula (1-2) is used.

Even when this exchange is performed, the probability distribution of states at an individual temperature accords with a Boltzmann distribution at the individual temperature. In addition, the relaxation time needed for the states to converge to this distribution is much less than that of conventional simulated annealing that does not perform the above exchange. See, for example, the following documents:

Japanese Laid-open Patent Publication No. 10-247186
Japanese Laid-open Patent Publication No. 09-34951
Koji Hukushima and Koji Nemoto, "Exchange Monte Carlo Method and Application to Spin Glass Simulations", Journal of the Physical Society of Japan, June 1996, Vol.65, No.6, pp.1604-1608.
Zheng Zhu, Chao Fang and Helmut G. Katzgraber, "borealis—A generalized global update algorithm for Boolean optimization problems", arXiv:1605.09399v1 [physics-.comp-ph], 30 May 2016.

As described above, while the replica exchange method accelerates solving an optimization problem, use of the replica exchange method does not guarantee the solving of all kinds of problems quickly.

When an optimization problem is solved by conventional simulated annealing or a conventional replica exchange method, in many cases, the evaluation function that needs to be minimized includes a cost function term that represents a value that needs to be minimized originally and a penalty function term for violation on the constraints that the solution needs to satisfy. If the ratio of the penalty function term is excessively small, the energy of a solution that does not satisfy the constraints represents a smaller value than that of the energy of an optimal solution. Thus, a relatively large value needs to be set as the penalty function term, depending on the problem to be solved. However, regarding the state transitions based on Monte Carlo searches, there are only a few problems in which a solution undergoes only states satisfying the constraints and an optimal solution is reached. Thus, a solution needs to undergo states that do not satisfy the constraints. However, when the penalty function term is large, large thermal excitation for a solution to undergo high-energy states is needed. Thus, few transitions occur. Therefore, in the case of problems in which the constraints are satisfied only when a significantly large value is set as the penalty function term, it takes much time to obtain an optimal solution or a solution whose energy is close to that of the optimal solution. Namely, even when the relaxation time is reduced by the replica exchange method, the problem could not be solved within a practical time.

The embodiments are directed to obtaining a good solution within a short time by extending the concept of the replica exchange method even when the penalty function term is large.

For example, Zheng Zhu, Chao Fang and Helmut G. Katzgraber, "borealis—A generalized global update algorithm for Boolean optimization problems", arXiv: 1605.09399v1 [physics.comp-ph], 30 May 2016 implies a replica exchange method in which the penalty function term is changed. However, Zheng Zhu, Chao Fang and Helmut G. Katzgraber, "borealis—A generalized global update algorithm for Boolean optimization problems", arXiv: 1605.09399v1 [physics.comp-ph], 30 May 2016 does not discuss any specific methods to implement the replica exchange method.

SUMMARY

According to one aspect, there is provided an optimization apparatus including: a plurality of annealing units; and an exchange control unit, wherein each of the plurality of annealing units includes a state storage unit that holds values of a plurality of state variables included in an evaluation function that represents an energy, a first calculation unit that calculates, upon occurrence of at least one state transition in which any of the values of the plurality of state variables changes, a cost function term in the evaluation function for each of a plurality of state transitions, a second calculation unit that calculates, upon occurrence of the at least one state transition in which any of the values of the plurality of state variables changes, a penalty function term in the evaluation function for each of the plurality of state transitions, and a transition control unit that stochastically determines whether to accept any of the plurality of state transitions, based on a product of a ratio between an inverse temperature and a penalty factor and the penalty function term and the cost function term, and wherein the exchange control unit supplies temperature information that indicates the inverse temperature and the penalty factor to each of the plurality of annealing units, the temperature information and the penalty factors having been set such that each of the plurality of annealing units has a different ratio between the inverse temperature and the penalty factor, receives the cost function term and the penalty function term from each of the plurality of annealing units, and exchanges an inverse temperature indicated by a temperature information supplied to a first annealing unit with an inverse temperature indicated by a temperature information supplied to a second annealing unit among the plurality of annealing units and a penalty factor supplied to the first annealing unit with a penalty factor supplied to the second annealing unit, in accordance with a probability based on the inverse temperatures, the penalty factors, the cost function terms, and the penalty function terms of the first annealing unit and the second annealing unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
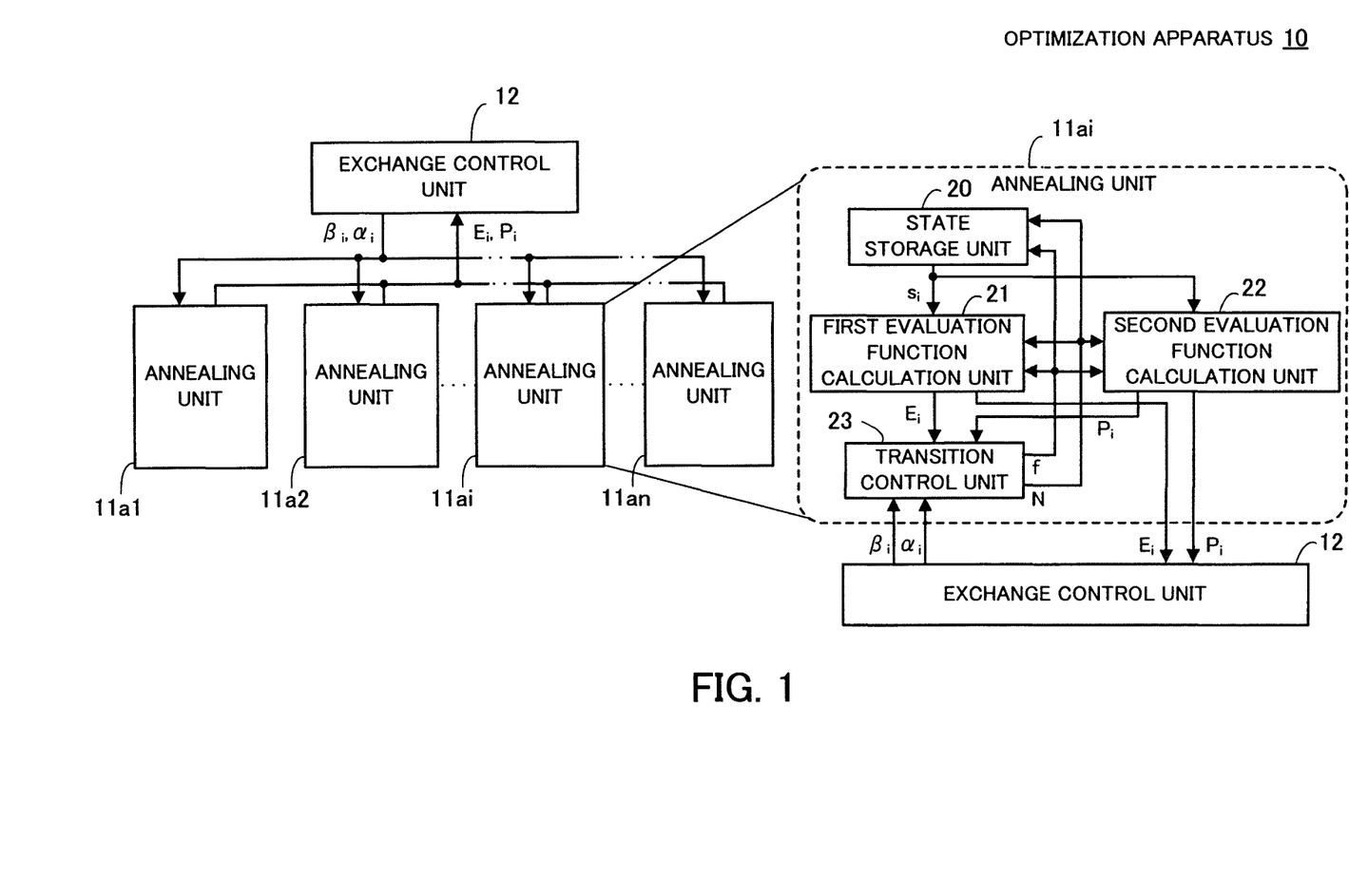
FIG. 1 illustrates a configuration example of an optimization apparatus that uses an extended replica exchange method.

FIG. 1 illustrates a configuration example of an optimization apparatus 10 that uses an extended replica exchange method according to the present embodiment. The optimization apparatus 10 includes annealing units 11$a$1, 11$a$2, . . . , 11$ai$, and 11$an$. The following description assumes that each of the annealing units 11$a$1 to 11$an$ calculates two evaluation functions and that two parameters are used to calculate a linear sum of the two evaluation functions. However, more evaluation functions and parameters may alternatively be used by the individual the annealing unit.

There are four major differences between the extended replica exchange method and conventional replica exchange methods. First, an exchange control unit 12 supplies two parameters, which are an inverse temperature $\beta_i$ ($1 \le i \le n$) and a penalty factor $\alpha_i$ to each of the annealing units 11$a$1 to 11$an$. Second, each of the annealing units 11$a$1 to 11$an$ includes two evaluation function calculation units (first and second evaluation function calculation units). The first evaluation function calculation unit calculates a cost function term $E_i$ that needs to be minimized, and the second evaluation function calculation unit calculates a penalty function term $p_i$ that denotes constraint violation. While $E_i$ is used as a reference character that denotes an energy in the above BACKGROUND, $E_i$ will hereinafter be used as a reference character that denotes a cost function term. Third, each of the annealing units 11$a$1 to 11$an$ includes a transition control unit, which determines whether to allow a transition by using change of an equivalent energy calculated from the corresponding cost function term $E_i$, penalty function term $p_i$, inverse temperature $\beta_i$, and penalty factor $\alpha_i$. Fourth, each time a certain number of iterations are performed, the exchange control unit 12 monitors the cost function terms $E_i$ and the penalty function terms $p_i$ corresponding to the states of the respective annealing units 11$a$1 to 11$an$. In addition, with a probability based on a relationship among the cost function terms $E_i$, the penalty function terms $p_i$, the inverse temperatures $\beta_i$ and the penalty factors $\alpha_i$ of two annealing units, the exchange control unit 12 exchanges the inverse temperature $\beta_i$ of one annealing unit with the inverse temperature $\beta_j$ of the other annealing unit and exchanges the penalty factor $\alpha_i$ of one annealing unit with the penalty factor $\alpha_j$ of the other annealing unit.

While FIG. 1 illustrates a configuration example of the annealing unit 11$ai$, the other annealing units have the same configuration. The annealing unit 11$ai$ includes a state storage unit 20, a first evaluation function calculation unit 21, a second evaluation function calculation unit 22, and a transition control unit 23.

The state storage unit 20 holds values of a plurality of state variables included in an evaluation function. In addition, based on a flag f that indicates a state transition determination result and a number N of a state variable indicated by the flag f, the state storage unit 20 updates a state $s_i$ corresponding to the values of the plurality of state variables.

When at least one state transition occurs, the first evaluation function calculation unit 21 calculates the cost function term $E_i$ in the evaluation function for each of a plurality of state transitions.

When the at least one state transition occurs, the second evaluation function calculation unit 22 calculates the penalty function term $p_i$ in the evaluation function for each of the plurality of state transitions. The first and second evaluation function calculation units 21 and 22 calculate the cost function term $E_i$ and the penalty function term $p_i$, respectively, by performing processing similar to the processing performed by the evaluation function calculation unit 61 to calculate an energy change. For example, the first and second evaluation function calculation units 21 and 22 may be realized by using logic circuits such as product-sum operation circuits.

The transition control unit 23 stochastically determines whether to accept any of the plurality of state transitions, based on the inverse temperature $\beta_i$ and the penalty factor $\alpha_i$ supplied from the exchange control unit 12, the cost function term $E_i$ and the penalty function term $p_i$. The transition control unit 23 performs general Monte Carlo iteration by using an equivalent energy $E_{eqi}$ expressed by the following formula (4).

$$E_{eqi} = E_{eqi}(s_i) = E(s_i) + \frac{\alpha_i}{\beta_i} P(s_i) \qquad (4)$$

Change of the equivalent energy $E_{eqi}$ is expressed by the following formula (5).

$$\begin{aligned}\Delta E_{eqi} &= E_{eqi}(s_i + \Delta s_i) - E_{eqi}(s_i) = \\ &\left(E(s_i + \Delta s_i) + \frac{\alpha_i}{\beta_i} P(s_i + \Delta s_i)\right) - \left(E(s_i) + \frac{\alpha_i}{\beta_i} P(s_i)\right) = \\ &(E(s_i + \Delta s_i) - E(s_i)) + \frac{\alpha_i}{\beta_i}(P(s_i + \Delta s_i) - P(s_i)) = \Delta E_i + \frac{\alpha_i}{\beta_i}\Delta P_i\end{aligned} \qquad (5)$$

Thus, an acceptance probability p of the state transition is expressed by the following formula (6).

$$p = f(-\beta_i \Delta E_{eqi}) = f(-\beta_i \Delta E_i - \alpha_i \Delta P_i) \qquad (6)$$

The exchange control unit 12 observes the cost function terms and the penalty function terms corresponding to the states of the respective annealing units each time a certain number of iterations are performed. In addition, by using the cost function terms, the penalty function terms, the inverse temperatures, and the penalty factors of two annealing units, the exchange control unit 12 exchanges the inverse temperature $\beta_i$ supplied to one annealing unit with the inverse temperature $\beta_j$ supplied to the other annealing unit and the penalty factor $\alpha_i$ supplied to one annealing unit with the penalty factor $\alpha_j$ supplied to the other annealing unit in accordance with a probability calculated by the following formula (7).

$$p_{ij} = f((\beta_i - \beta_j)(E_i - E_j) + (\alpha_i - \alpha_j)(P_i - P_j)) \qquad (7)$$

In formula (7), $\beta_j$ denotes the inverse temperature supplied to the j-th annealing unit not illustrated, and $\alpha_j$ denotes the penalty factor supplied to the j-th annealing unit. In addition, $E_j$ denotes the cost function term calculated by the j-th annealing unit, and $p_j$ denotes the penalty function term calculated by the j-th annealing unit. In formula (7), the function f is equivalent to formula (1-1), and for example, a function based on a Metropolis method expressed by formula (1-2) is used.

The exchange control unit 12 may be realized by using, for example, a subtraction circuit, an addition circuit, a multiplication circuit, and an exponential function calculation circuit for calculating the probability $p_{ij}$ expressed by formula (7), a circuit for generating a random number, a circuit for determining an exchange determination result based on a result of the comparison between the random number and the probability $p_{ij}$.

Next, an operating principle and effects of the optimization apparatus 10 will be described.

Hereinafter, a state (replica) of each of the annealing units 11a1 to 11an will be denoted by $s_i$ ($1 \le i \le n$). In addition, the equivalent energy $E_{eqi}$ is expressed by the above formula (4), and the total energy in a state space $s=(s_1, s_2, \ldots, s_n)$ in which all the states of the annealing units 11a1 to 11an are summarized (direct product) is defined as the following formula (8).

$$E = \sum_i \frac{\beta_i}{\beta} E_{eqi} = \sum_i \frac{\beta_i}{\beta}\left(E_i + \frac{\alpha_i}{\beta_i} P_i\right) = \frac{1}{\beta}\sum_i (\beta_i E_i + \alpha_i P_i) \qquad (8)$$

In formula (8), $\beta$ denotes the inverse temperature in the state space s. There are cases in which a state change $\Delta s_i$ in an individual replica is considered as a transition and in which a state exchange between replicas is considered as a transition. The ratio between the total energy change and the temperature in the former case is expressed by the following formula (9). The ratio between the total energy change and the temperature in the latter case is expressed by the following formula (10).

$$\beta\Delta E(\Delta s_i) = \beta_i\left(\Delta E_i(\Delta s_i) + \frac{\alpha_i}{\beta_i}\Delta P_i(\Delta s_i)\right) \qquad (9)$$

$$\begin{aligned}\beta\Delta E(s_i \leftrightarrow s_j) &= \{(\beta_j E_i + \alpha_j P_i) + (\beta_i E_j + \alpha_i P_j)\} - \{(\beta_i E_i + \alpha_i P_i) + \\ &(\beta_j E_j + \alpha_j P_j)\} = -(\beta_i - \beta_j)(E_i - E_j) - (\alpha_i - \alpha_j)(P_i - P_j)\end{aligned} \qquad (10)$$

When a transition is allowed based on a Metropolis method or the like by using these formulas, the individual state s converges to a Boltzmann distribution determined by the inverse temperature $\beta$ and the energy E. In this case, when the state $s_i$ in the individual annealing unit is focused, the individual state $s_i$ converges to a Boltzmann distribution determined by the inverse temperature $\beta_i$ and the equivalent energy $E_{eqi}$.

The former transition and the latter transition do not need to be performed simultaneously. This is because, even when these transitions are performed separately, a transition to any state is possible within a finite number of iterations and detailed balance in a Boltzmann distribution is also established. Since the former transition is independent of the individual subspace state $s_i$, the transition may be performed in parallel per replica.

As in a conventional replica exchange method, a state stuck at a local solution at a low temperature transitions more easily by raising the temperature. Namely, the state escapes from the local solution more easily. In addition, the state escapes from the local solution even more easily if the exchange control unit 12 selects the penalty factor $\alpha_i$ such that a smaller $\alpha_i/\beta_i$ is obtained at a higher temperature (a smaller $\beta_i$), since the height of the wall that the state goes over at a high temperature is dropped. Thus, the state escapes from the local solution more easily, and the energy drops more quickly, compared with conventional simulated annealing and conventional replica exchange methods. As a result, high-speed Monte Carlo searches are performed. Namely, the optimization problem calculation time is shortened.

In addition, by setting a sufficiently large $\alpha_i/\beta_i$ at a low temperature, solutions that do not satisfy the constraints at the low temperature are not allowed. Thus, desirable solutions that satisfy the constraints and have smaller energies tend to gather at annealing units at the low temperature.

In the above description, states are exchanged. However, the same effects are obtained by exchanging the inverse temperatures $\beta_j$ and the penalty factors $\alpha_i$, instead of exchanging the states. Thus, it is seen that the above operation is substantially the same as that of the optimization apparatus 10 illustrated in FIG. 1.

From the above description, it is seen that, even in the case of a problem in which a solution that results in constraint violation is obtained unless the ratio of the penalty function term $p_i$ is increased, the optimization apparatus 10 as illustrated in FIG. 1 shortens the calculation time for obtaining an accurate solution.

Hereinafter, four embodiments about how $\alpha_i/\beta_i$, is actually determined, and software-simulation-based implementation examples indicating the above effects will be described. In the above description, for simplicity, one of the two evaluation functions, which are independently calculated, includes only the cost function terms, and the other evaluation function includes only the penalty function terms. However, as long as linear independence is maintained, both the cost and penalty function terms may be used as described in a third embodiment.

The above extended replica exchange method is approximately the same as a conventional replica exchange method, except the above four main differences. No other changes need to be made to the other aspects of the configuration for realizing a conventional replica exchange method. Thus, the above extended replica exchange method is applicable to problems, without dependence on a group of state transitions allowable in an individual replica, the form of an individual evaluation function, the calculation method of the evaluation function, etc.

First Embodiment

In the first embodiment, the exchange control unit 12 changes the individual inverse temperature $\beta_i$ and the individual penalty factor $\alpha_i$ such that the larger the inverse temperature $\beta_i$ is, the larger $\alpha_i/\beta_i$ will be. There are no other constraints about how the exchange control unit 12 changes these parameters. Thus, the configuration and operation of the optimization apparatus 10 are as described above.

Since the equivalent energy $E_{eqi}$ of each replica is expressed by formula (4), a state transition more easily occurs in a replica having a smaller inverse temperature $\beta_i$ (a higher temperature) than that in a replica having a larger inverse temperature $\beta_i$.

The exchange control unit 12 exchanges a combination of the inverse temperature $\beta_i$ and the penalty factor $\alpha_i$ of one annealing unit with a combination of the inverse temperature $\beta_i$ and the penalty factor $\alpha_i$ of another annealing unit in accordance with the probability expressed by the above formula (7). In this way, a replica having a state with the smaller (desirable) cost function term $E_i$ and the smaller penalty function term $p_i$ is supplied with the larger inverse temperature $\beta_i$ and the larger penalty factor $\alpha_i$.

For example, the following information is used as the individual inverse temperature $\beta_i$ and the individual penalty factor $\alpha_i$. For example, when the inverse temperature $\beta_i$ is set as a geometric sequence, as the penalty factor $\alpha_i$, a geometric sequence whose common ratio is larger than that of the inverse temperature $\beta_i$ may be set. Alternatively, information obtained by multiplying a geometric sequence having the same common ratio by a monotonically increasing sequence (for example, an arithmetic sequence) may be used.

As described above, since individual states do not converge based on the Markov Chain Monte Carlo methods at a finite temperature, a minimum energy state obtained after Monte Carlo searches is held and outputted as a final answer. Each replica performs Monte Carlo searches while exchanging a combination of the inverse temperature $\beta_i$ and the penalty factor $\alpha_i$ under control of the exchange control unit 12. Since $\alpha_i/\beta_i$ is small when the inverse temperature $\beta_i$ is small, a state in which the constraints are not satisfied could represent a minimum energy. This value could be smaller than the energy corresponding to the value of the global solution.

Thus, for example, when the exchange control unit 12 determines a state representing a minimum energy, a separately defined common evaluation function is used, not the equivalent energy $E_{eqi}$ at an individual temperature. To select a solution that does not represent any constraint violation, an evaluation function that represents a sufficiently large $\alpha/\beta$ is used. Alternatively, among the states that satisfy a penalty function term $p_i=0$, the state that has the minimum cost function term $E_i$ is selected. This evaluation function may be calculated only by at least one hardware element for obtaining a linear sum of the cost function term $E_i$ and the penalty function term $p_i$.

For example, each of the annealing units 11a1 to 11an calculates an equivalent energy by using the cost function term $E_i$, the penalty function term $p_i$, a sufficiently large $\alpha/\beta$ common among all the annealing units and holds the minimum equivalent energy and the corresponding state. After the annealing units 11a1 to 11an perform a certain number of iterations of Monte Carlo searches, the annealing units 11a1 to 11an output all the minimum equivalent energies held therein and the corresponding states. Alternatively, only the minimum equivalent energy among these minimum equivalent energies is outputted.

Figure 2:
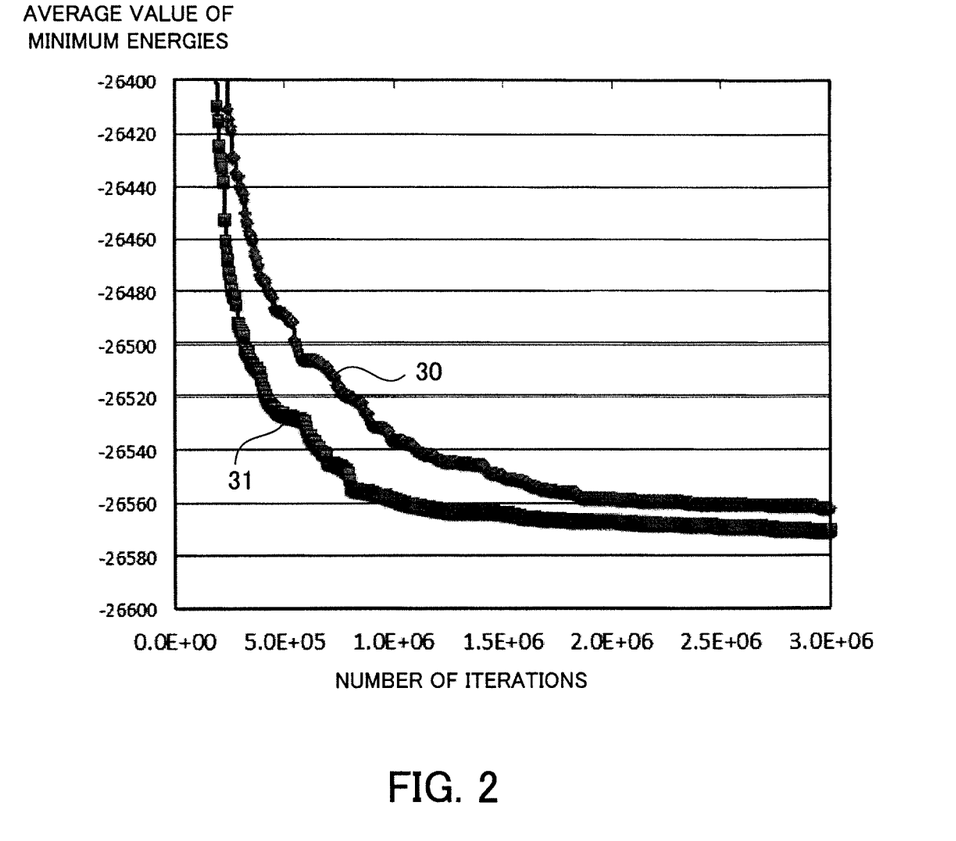
FIG. 2 illustrates examples of simulation results obtained from 1,024-bit ising evaluation functions.

FIG. 2 illustrates examples of simulation results obtained from 1,024-bit ising evaluation functions. The horizontal axis indicates the number of iterations, and the vertical axis indicates an average value of minimum energies. In FIG. 2, a reference numeral 30 indicates simulation results obtained by a conventional replica exchange method that uses the optimization apparatus 50 in FIG. 5, and a reference numeral 31 indicates simulation results obtained by the extended replica exchange method that uses the optimization apparatus 10 in FIG. 1.

The number of replicas (the number of annealing units 11a1 to 11an) was set to 100, and the following values were used as the inverse temperature $\beta_i$ and the penalty factor $\alpha_i$.

$$\beta_i = 0.0125 \times 20^{i/99}$$

$$\alpha_i = \beta_i \times (0.1 + 0.9 \times i/99)$$

While the same inverse temperature $\beta_i$ was also used in the conventional replica exchange method, $\alpha_i$ was set to be equal to $\beta_i (\alpha_i = \beta_i)$.

As illustrated in FIG. 2, when the number of iterations needed to obtain an approximate solution is compared between the two methods, it is seen that the extended replica exchange method is about twice faster than the conventional replica exchange method. In addition, when the time needed to reach an energy close to a correct solution is compared between the two methods, it is seen that the extended replica exchange method is several times faster than the conventional replica exchange method.

Second Embodiment

In a second embodiment, the exchange control unit 12 sets all the inverse temperatures $\beta_i$ to a single value $\beta$ and changes the penalty factor $\alpha_i$. For example, the exchange control unit 12 sets the penalty factor $\alpha_i$ as an arithmetic sequence or a geometric sequence.

In the second embodiment, since the equivalent energy $E_{eqi}$ of each replica is expressed by $E'_{eqi}(s_i)=E(s_i)+(\alpha_i/\beta)P(s_i)$, a state transition more easily occurs in a replica having a smaller penalty factor $\alpha_i$ than that in a replica having a larger penalty factor $\alpha_i$. Thus, a replica having a smaller penalty factor $\alpha_i$ corresponds to a high-temperature replica in a conventional replica exchange method.

Since the probability that the penalty factor $\alpha_i$ is exchanged is expressed by $p_{ij}=f((\alpha_i-\alpha_j)(p_i-p_j))$, a replica having a state with the smaller (desirable) penalty function term $p_i$ is supplied with the larger penalty factor $\alpha_i$.

According to the second embodiment, since all the inverse temperatures $\beta_i$ are set to a single value $\beta$, the calculation for the exchange is made simpler than that according to the first embodiment. In addition, the communication amount between the annealing units 11a1 to 11an and the exchange control unit 12 is reduced.

Third Embodiment

In a third embodiment, the exchange control unit 12 selects the penalty factor $\alpha_i$ to satisfy $\alpha_i=c\beta_i-d$, in which c and d denote predetermined constants.

In this case, from the above formula (7), the exchange probability is expressed as $p_{ij}=f((\beta_i-\gamma(E_i+cP_i-E_j-cP_j))$.

The first evaluation function calculation unit calculates $E_i+cP_i$ (or $E_j+cP_j$), and the second evaluation function calculation unit 22 calculates $P_i$ (or $P_j$). In this way, when the exchange control unit 12 performs exchange of the inverse temperatures $\gamma_j$ and the penalty factors $\alpha_i$, the exchange control unit 12 does not need to receive the calculation result obtained by the second evaluation function calculation unit 22. Thus, the calculation for the exchange is made simpler than that according to the first embodiment. In addition, the communication amount between the annealing units 11a1 to 11an and the exchange control unit 12 is reduced.

Fourth Embodiment

In a fourth embodiment, the exchange control unit 12 changes the individual inverse temperatures $\beta_i$ and the individual penalty factors $\alpha_i$ independently and supplies one of the inverse temperatures $\beta_i$ and one of the penalty factors $\alpha_i$ to each of the replicas. When the number of inverse temperatures $\beta_i$ is $N_\beta$ and the number of penalty factors $a_i$ is $N_\alpha$, the following formula (11) is obtained.

$$\beta_{i_\beta * N\alpha + i_\alpha} = b_{i_\beta}$$

$$\alpha_{i_\beta * N\alpha + i_\alpha} = a_{i_\alpha} \quad (11)$$

The exchange probability between replicas having the same penalty factor (neighboring inverse temperatures) is expressed by $p_{ij}=f((\beta_i-\beta_j)(E_i-E_j))$. The exchange probability between replicas having the same inverse temperature (neighboring penalty factors) is expressed by $p_{ij}=f((\alpha_i-\alpha_j)(p_i-p_j))$.

While the exchange control unit 12 performs the above two kinds of exchange each time a certain number of iterations are performed, the two kinds of exchange may be performed consecutively or alternately. A replica having a state with the smaller (desirable) cost function term $E_i$ and the smaller (desirable) penalty function term $p_i$ is supplied with the larger inverse temperature $\beta_i$ and the larger penalty factor $\alpha_i$.

In this method, while the exchange is somewhat complex, since there are not constraints on the relationship between the inverse temperature $\beta_i$ and the penalty factor $\alpha_i$, these parameters are set more freely.

Figure 3:
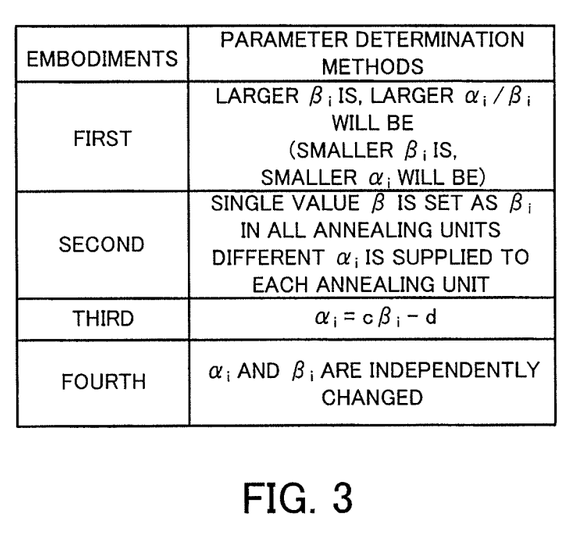
FIG. 3 illustrates a summary of parameter determination methods according to four embodiments.

FIG. 3 illustrates a summary of the parameter determination methods according to four embodiments.

The inverse temperature $\beta_i$ and the penalty factor $\alpha_i$ are determined by one of the methods according to the above four embodiments.

Figure 4:
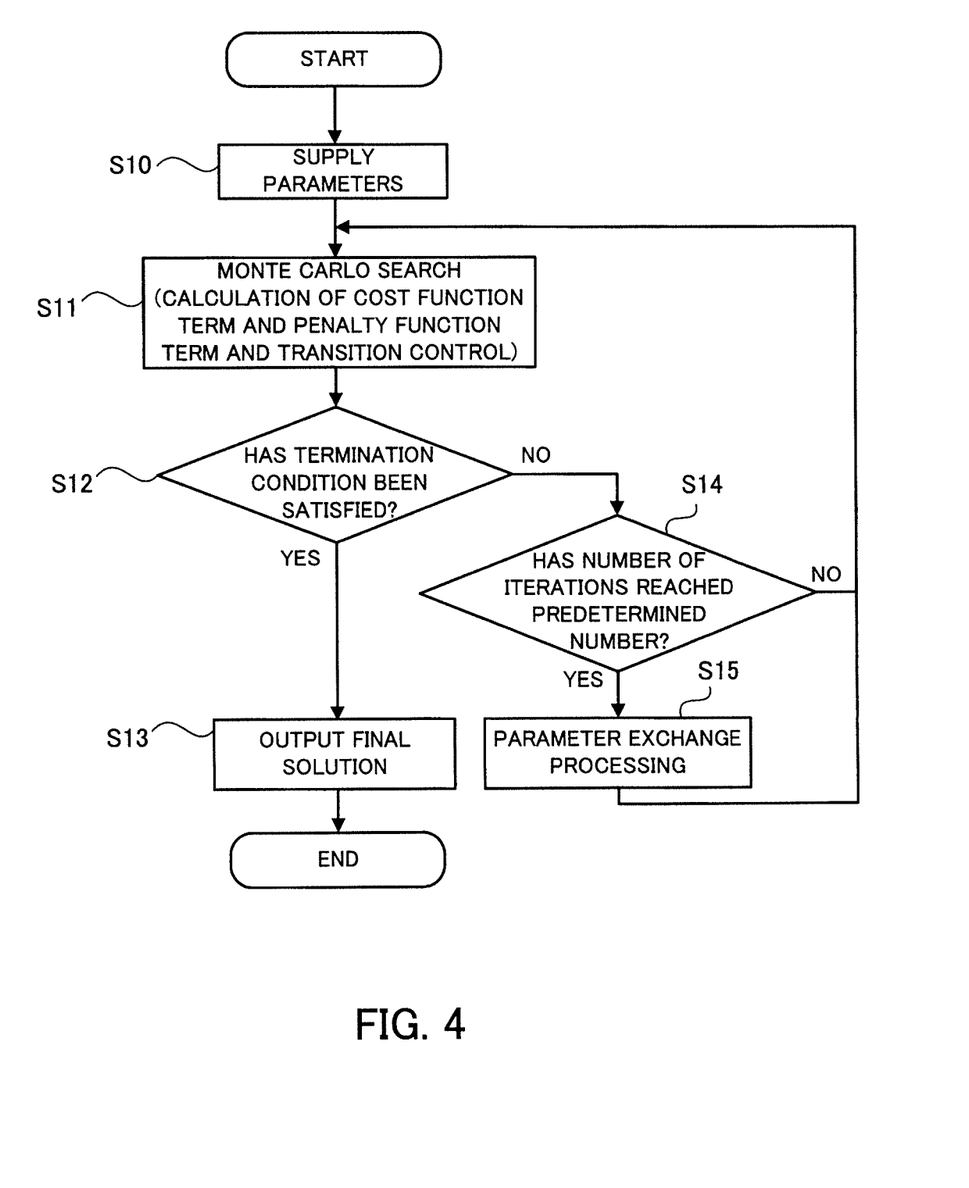
FIG. 4 is a flowchart illustrating an operation example of the optimization apparatus.

Finally, an overall operation of the optimization apparatus 10 will be described with reference to a flowchart.

FIG. 4 is a flowchart illustrating an operation example of the optimization apparatus.

The exchange control unit 12 supplies the parameters (the inverse temperature $\beta_i$ and the penalty factor $\alpha_i$), which have been determined according to any one of the above embodiments, to each of the annealing units 11a1 to 11an (step S10). Each of the annealing units 11a1 to 11an performs a Monte Carlo search (step S11). The Monte Carlo search includes the above calculation of the cost function term $E_i$ and penalty function term $p_i$ and the above processing performed by the transition control unit 23 (transition control).

Next, the exchange control unit 12 determines whether a Monte Carlo search termination condition has been satisfied (for example, whether the number of iterations as the termination condition has been reached) (step S12).

If the termination condition has been reached, the exchange control unit 12 outputs a final solution as described above (step S13) and ends the processing. The final solution is, for example, supplied to an apparatus outside the optimization apparatus 10 (for example, a computer) or a memory not illustrated.

If the termination condition has not been satisfied, the exchange control unit 12 determines whether the number of iterations has reached a predetermined number (a value smaller than the number of iterations as the termination condition) (step S14). If the number of iterations has reached the predetermined number, the exchange control unit 12 performs parameter exchange processing in accordance with the above exchange probability (step S15). Next, the processing returns to step S11. If the number of iterations has not reached the predetermined number, the processing also returns to step S11.

While an aspect of the optimization apparatus and control methods thereof based on embodiments has been described, the above description is only an example. The embodiments are not limited to the above description.

For example, in the above description, while the exchange control unit 12 supplies the inverse temperature $\beta_i$ to each of the annealing units 11a1 to 11an, the exchange control unit 12 may supply a temperature to each of the annealing units 11a1 to 11an. In this case, each of the annealing units 11a11 to 11*an* may convert the temperature to the inverse temperature $\beta_i$ by using a conversion table or the like.

In an aspect, the embodiments shorten the calculation time of an optimization problem whose evaluation function includes a penalty function term.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An optimization apparatus comprising:
    a plurality of annealing circuits; and
    an exchange control circuit,
    wherein each of the plurality of annealing circuits includes
        a state storage circuit that holds values of a plurality of state variables included in an evaluation function that represents an energy,
        a first calculation circuit that calculates, upon occurrence of at least one state transition in which any of the values of the plurality of state variables changes, a cost function term in the evaluation function for each of a plurality of state transitions,
        a second calculation circuit that calculates, upon occurrence of the at least one state transition in which any of the values of the plurality of state variables changes, a penalty function term in the evaluation function for each of the plurality of state transitions, and
        a transition control circuit that stochastically determines whether to accept any of the plurality of state transitions, based on a product of a ratio between an inverse temperature and a penalty factor and the penalty function term and the cost function term, and
    wherein the exchange control circuit supplies temperature information that indicates the inverse temperature and the penalty factor to each of the plurality of annealing circuits, the temperature information and the penalty factors having been set such that each of the plurality of annealing circuits has a different ratio between the inverse temperature and the penalty factor, receives the cost function term and the penalty function term from each of the plurality of annealing circuits, and exchanges an inverse temperature indicated by a temperature information supplied to a first annealing circuit with an inverse temperature indicated by a temperature information supplied to a second annealing circuit among the plurality of annealing circuits and a penalty factor supplied to the first annealing circuit with a penalty factor supplied to the second annealing circuit, in accordance with a probability based on the inverse temperatures, the penalty factors, the cost function terms, and the penalty function terms of the first annealing circuit and the second annealing circuit.

2. The optimization apparatus according to claim 1, wherein the transition control circuit stochastically determines whether to accept any of the plurality of state transitions, based on change of an equivalent energy, which is a sum of a product of the ratio and the penalty function term and the cost function term.

3. The optimization apparatus according to claim 1, wherein the exchange control circuit supplies the temperature information that indicates the inverse temperature and the penalty factor to any of the plurality of annealing circuits, the penalty factor having been set such that a value obtained by dividing the penalty factor by the inverse temperature is smaller at a smaller inverse temperature.

4. The optimization apparatus according to claim 1, wherein the exchange control circuit supplies the temperature information that indicates a same inverse temperature and a different penalty factor to each of the plurality of annealing circuits.

5. The optimization apparatus according to claim 1, wherein the penalty factor is a value obtained by subtracting a constant from a product of the inverse temperature and a proportionality factor, and the first calculation circuit calculates a sum of a product of the penalty function term and the proportionality factor and the cost function term.

6. The optimization apparatus according to claim 1, wherein the exchange control circuit changes the inverse temperature and the penalty factor independently and supplies the inverse temperature and the penalty factor to each of the plurality of annealing circuit.

7. A control method of an optimization apparatus, the control method comprising:
    holding, by a state storage unit included in each of a plurality of annealing units, values of a plurality of state variables included in an evaluation function that represents an energy;
    calculating, by a first calculation unit included in each of the plurality of annealing units, upon occurrence of at least one state transition in which any of the values of the plurality of state variables changes, a cost function term in the evaluation function for each of a plurality of state transitions;
    calculating, by a second calculation unit included in each of the plurality of annealing units, upon occurrence of the at least one state transition in which any of the values of the plurality of state variables changes, a penalty function term in the evaluation function for each of the plurality of state transitions;
    stochastically determining, by a transition control unit included in each of the plurality of annealing units, whether to accept any of the plurality of state transitions, based on a product of a ratio between an inverse temperature and a penalty factor and the penalty function term and the cost function term; and
    supplying, by an exchange control unit, temperature information that indicates the inverse temperature and the penalty factor to each of the plurality of annealing units, the temperature information and the penalty factors having been set such that each of the plurality of annealing units has a different ratio between the inverse temperature and the penalty factor, receiving the cost function term and the penalty function term from each of the plurality of annealing units, and exchanging an inverse temperature indicated by a temperature information supplied to a first annealing unit with an inverse temperature indicated by a temperature information supplied to a second annealing unit among the plurality of annealing units and a penalty factor supplied to the first annealing unit with a penalty factor supplied to the second annealing unit, in accordance with a probability based on the inverse temperatures, the penalty factors, the cost function terms, and the penalty function terms of the first annealing unit and the second annealing unit.

* * * * *